(12) United States Patent
Ubukata et al.

(10) Patent No.: US 7,421,003 B2
(45) Date of Patent: Sep. 2, 2008

(54) EMISSION WAVELENGTH-PROGRAMMABLE ORGANIC DISTRIBUTED FEEDBACK LASER

(75) Inventors: Takashi Ubukata, Saitama-ken (JP); Takashi Isoshima, Saitama-ken (JP)

(73) Assignee: Riken, Wako-Shi (JP)

( * ) Notice: Subject to any disclaimer, the term of this patent is extended or adjusted under 35 U.S.C. 154(b) by 75 days.

(21) Appl. No.: 10/952,792

(22) Filed: Sep. 30, 2004

(65) Prior Publication Data

US 2005/0111513 A1 May 26, 2005

(30) Foreign Application Priority Data

Oct. 1, 2003  (JP)  ............. 2003-343191

(51) Int. Cl.
*H01S 3/08* (2006.01)
(52) U.S. Cl. .................. 372/96; 372/102
(58) Field of Classification Search ........ 372/96, 372/102
See application file for complete search history.

(56) References Cited

U.S. PATENT DOCUMENTS

| 5,233,187 A * | 8/1993 | Sakata et al. ........ 250/227.24 |
| 6,410,416 B1 | 6/2002 | Dodabalapur et al. |
| 2002/0012372 A1* | 1/2002 | Shveykin ............. 372/45 |
| 2002/0097766 A1* | 7/2002 | Tsukiji et al. ........ 372/50 |
| 2003/0006429 A1* | 1/2003 | Takahashi et al. ..... 257/200 |
| 2004/0165641 A1* | 8/2004 | Garnache et al. ...... 372/97 |
| 2005/0030540 A1* | 2/2005 | Thornton ............. 356/432 |

FOREIGN PATENT DOCUMENTS

| DE | 198 05 993 A1 | 7/1999 |
| JP | 2002-105339 A | 4/2002 |
| JP | 2003-082033 A | 3/2003 |
| JP | 2003-332199 A | 11/2003 |

OTHER PUBLICATIONS

Matsui et al., Jpn. J. Appl. Phys., vol. 41, Part 2, No. 12A, pp. L1386-L1388 Dec. 2002.*
Takashi Ubukata et al., Adv. Mater., Nov. 16, 2000, vol. 12, No. 22, pp. 1675-1678, Wiley VCH Verlag GmbH.
Takashi Ubukata et al., Adv. Mater., Feb. 3, 2004, vol. 16, No. 3, pp. 220-223, Wiley-VCH Verlag GmbH.
Matsui et al., Jpn. J. Appl. Phys., vol. 41, Part 2, No. 12A, pp. L1386-L1388 (Dec. 2002).
Nagata, T. et al., Novel Optical Properties of Conducting Polymer-photochromic Polymer Systems, Synthetic Metals, vol. 119, pp. 607-608, (2001).

(Continued)

*Primary Examiner*—Armando Rodriguez
(74) *Attorney, Agent, or Firm*—Birch, Stewart, Kolasch & Birch, LLP

(57) ABSTRACT

An organic distributed feedback layer, which comprises a resonator in a double layer structure comprising a photo-induced mass transfer material layer and an organic fluorescence layer, provided as an under layer below the former layer, where the photo-induced mass transfer material is a polymer material having an azobenzene skeleton represented by the following chemical structure:

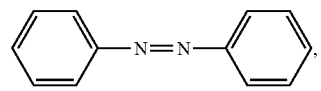

has such a characteristic that the laser emission wavelength is programmable by changing interference exposure conditions for forming gratings of the photo-induced mass transfer material.

12 Claims, 3 Drawing Sheets

OTHER PUBLICATIONS

Ozaki, Masanori et al., Photoinduced Surface Relief Grating on Composite Film of Conducting Polymer and Polyacrylate Containing Azo-Substituent, Jpn. J. Appl. Phys. vol. 39, Pt. 2, No. 6B, pp. 614-616, (Jun. 15, 2000).

Rocha, Licinio et al., Laser Emission in Periodically Modulated Polymer Films, Journal of Applied Physics, vol. 89, No. 5, pp. 3067-3069, (Mar. 1, 2001).

* cited by examiner

EMISSION WAVELENGTH-PROGRAMMABLE ORGANIC DISTRIBUTED FEEDBACK LASER

This Nonprovisional application claims priority under 35 U.S.C. § 119(a) on Patent Application No(s). 2003-343191 filed in Japan on Oct. 1, 2003, the entire contents of which are hereby incorporated by reference.

BACKGROUND OF THE INVENTION

The present invention pertains to a technical field of laser, and particularly relates to an emission wavelength-programmable organic distributed feedback laser.

Drastic development of communication technology, typically personal computers, portable telephones, internets, etc. is called "IT revolution", bringing radical changes to the industrial and social structures. Furthermore, as to the promotion of domestic internet prevalence, optical fibers including optical fibers of organic polymers have been already, domestically used, and thus development of low cost, high performance organic waveguide lasers capable of handling much larger amount of information in future has been in urgent need.

It is well known, on the other hand, that when a thin film of having azobenzene groups is subject to interference exposure with such a wavelength as to induce photoisomerization periodic grooves (surface relief gratings) are formed by mass transfer of the polymers on a nanometer-micrometer level (e.g. JP-A-2003-82033).

In the formation of surface relief gratings on the azobenzene polymer thin film by interference exposure, it has been reported that the polymer complexes containing functional molecules such as low molecular weight liquid crystals, etc. dispersed therein as a guest compound can increase the grating formation sensitivity by about 3 order of magnitude at the maximum as a synergistic effect of the functional molecules, so far not observable in the case of single azobenzene polymers (e.g. JP-A-2002-105339; T. Ubukata et al: Surface Relief Grating in Host-Guest Supramolecular Materials, Wiley-VCH Verlag GmbH & Co. KGaA, 2000, 12, p.1675-1678). The sensitivity has been found higher than that of the ordinary photoresist.

The periodic groove structure formed by photo-induced organic mass transfer of the azobenzene thin film has such characteristics as omission of the developing step, erasability and rewritability by light or heat, and thus the azobenzene polymers have been regarded as promising reversible, environmentally low load materials.

As to the organic distributed feedback (DFB) laser, it has been reported that laser emission is attained by periodic modulation of gains through interference photoexcitation, but in view of its application to devices the interference photoexcitation seems to be substantially impossible to conduct. Furthermore, a process for fabricating an organic DFB laser by molding has been reported, but due to the fixed laser structure the wavelength is not tunable.

SUMMARY OF THE INVENTION

An object of the present invention is to provide a high performance, organic DFB laser on the basis of grating formation characteristics of photo-induced mass transfer material to satisfy the need to develop a high performance organic waveguide laser.

Another object of the present invention is to provide an emission wavelength-programmable organic DFB laser on the basis of such azobenzene polymer characteristics as erasability and rewritability of gratings.

Other object of the present invention is to provide a simple, low cost and environmentally low load process for fabricating an organic DFB laser.

These objects of the present invention can be attained by an organic DFB laser comprising a resonator based on a combination of azobenzene polymers of high sensitivity as a molecule transport material on a nanometer-micrometer level with another guest compound (organic fluorescent molecule), characterized in that the emission waveguide is programmable by surface relief grating formability of the azobenzene polymers.

That is, the present invention provides an organic distributed feedback laser, which comprises a resonator in a single layer structure comprising a photo-induced mass transfer material and an organic fluorescent molecule.

The present invention further provides an organic distributed feedback laser, which comprises a resonator in a double layer structure comprising a photo-induced mass transfer material layer and an organic fluorescence layer provided as an underlayer below the former layer.

In the present organic DFB layer comprising a resonator in a single layer structure or a double layer structure, the photo-induced mass transfer material is a polymeric material having an azobenzene skeleton represented by the following chemical structure:

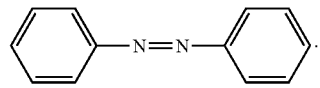

The present organic DFB laser can be fabricated at a low cost as an advantage. Furthermore, the present organic DFB laser is a wavelength-programmable laser capable of erasing and rewriting, and thus has a bright prospect as a simple laser source with a high degree of freedom in the research and development of optical systems.

DETAILED DESCRIPTION OF THE INVENTION

The term "organic distributed feedback (DFB) laser" herein used means a distributed feedback laser, where an organic compound is used as a light-amplificable medium or a resonator structure, and the term "distributed feedback (DFB) laser" means a laser, whose resonator structure is established by forming gratings in a light-amplificable medium dominant region or in the neighbor thereof.

Photo-induced mass transfer materials for use in the present invention are polymeric materials having an azobenzene skeleton represented by the following chemical formula:

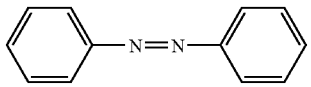

and preferably those having azobenzene skeleton in side chains, where the structure of the main chain is not particularly limited, and the side chains can have various structures.

The present organic DFB laser comprises a resonator based on a combination of the aforementioned photo-induced mass transfer material with another light-amplificable medium.

Figure 1:
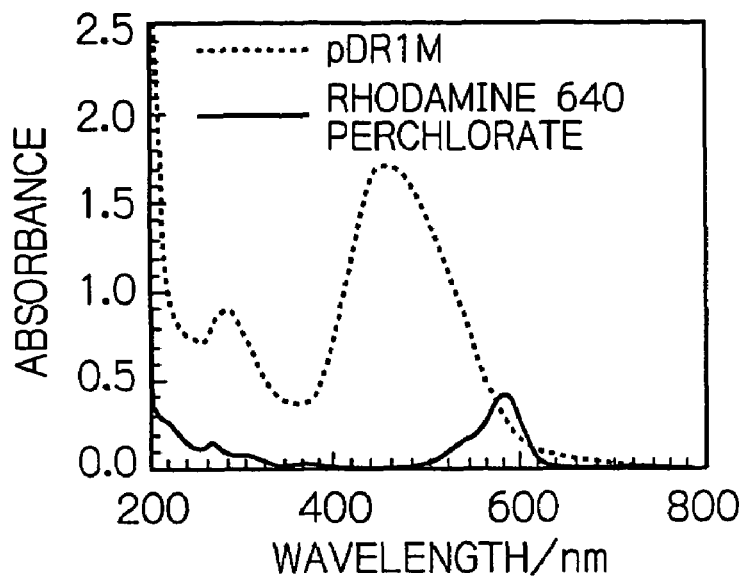
FIG. 1 shows ultraviolet visible light absorption spectra of azobenzene polymer (pDR1M) (dotted line) and an organic fluorescent molecule (Rhodamine 640 perchlorate) (full line) in thin film according to the present invention.

As a light-amplificable medium, organic fluorescent molecules, etc. can be used upon selection in view of the absorption spectra of photo-induced mass transfer material to be used. For example, an azobenzene polymer having the following repeat unit, which will be hereinafter referred to as pDR1M, as a photo-induced mass transfer material:

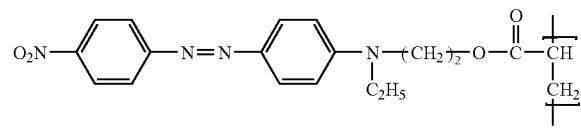

has a peak at about 460 nm, as shown in FIG. 1 showing its ultraviolet visible light absorption spectra. Thus, the absorption band of an organic fluorescent molecule must not overlap completely with the absorption band of pDR1M to discriminate from each other. For example, Rhodamine 640 perchlorate (FIG. 1, absorption band: around 580 nm), Surforhodamine 640 (absorption band: around 600 nm), Malachite green (absorption band: around 630 nm), Oxazine 725 (absorption band: around 650 nm), HIDC iodide (absorption band: around 650 nm), LD 800 (absorption band: around 690 nm), etc. those being commercially available from Exiton Co. As one example, ultraviolet visible light absorption spectra of pDR1M (dotted line) and Rhodamine 640 perchlorate (full line) in this film are shown in FIG. 1.

Figure 2:
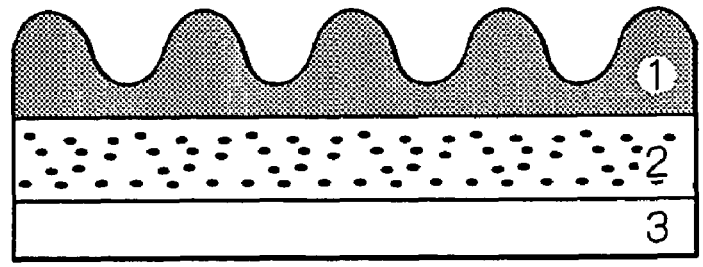
FIG. 2 is a schematic profile showing one embodiment (double layer structure) of a resonator of an organic DFB laser according to the present invention.

According to one embodiment of the present invention, the resonator of the present organic DFB laser can be in a double layer structure, and can be fabricated, for example, in the following manner. At first, organic fluorescent molecules and polymers serving as a matrix are mixed in to an appropriate solvent, and then the resulting liquid mixture is applied to a substrate with a flat surface by the well known coating method, such as spin coating, to form an organic fluorescence layer. The resulting organic fluorescence layer is dried, if required. Then, a photo-induced mass transfer material is mixed into an appropriate solvent, and the resulting liquid mixture is applied to the surface of the organic fluorescence layer by the well known coating method such as spin coating to form a photo-induced mass transfer material layer. The solvent is then removed from the resulting coating film by drying, if required. Thickness of each layer is not particularly limited, but in the single transversal waveguide mode condition and in view of the case of using the above-mentioned materials and quartz as a substrate, the thickness of the photo-induced mass transfer material layer is preferably 50-150 nm, and that of the organic fluorescence layer is preferably 300-800 nm. FIG. 2 shows a schematic profile of a resonator of the present organic DFB laser according to the instant embodiment, where numerical 1 shows a photo-induced mass transfer material layer, 2 an organic fluorescence layer, and 3 a substrate.

Figure 3:
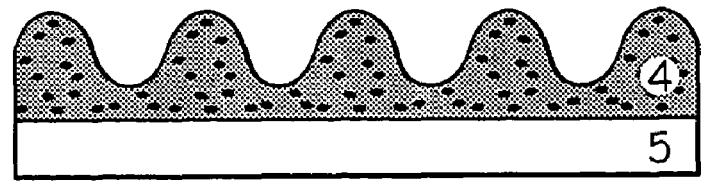
FIG. 3 is a schematic profile showing another embodiment (single layer structure) of a resonator of an organic DFB laser according to the present invention.

According to another embodiment of the present invention, the resonator of the present organic DFB laser is in a single layer structure. The resonator in a single layer structure can be fabricated by mixing a combination of a photo-induced mass transfer material with an organic fluorescent molecules into an appropriate solvent, and applying the resulting liquid mixture to a substrate having a flat surface by the well known coating method such as spin coating. A combination of the photo-induced mass transfer material and the organic fluorescent molecules can be selected in view of absorption spectra, as so far described above. Thickness of the single layer is not limited, but is preferably 100-400 nm. FIG. 3 is a schematic profile of the resonator of the present organic DFB laser, where numerical 4 shows a layer of photo-induced mass transfer material and organic fluorescent molecules, and 5 a substrate.

The present emission wavelength-programmable organic DFB laser is based on a combination of the photo-induced mass transfer material with organic fluorescent molecules and can be attained by a combination of a resonator having surface relief gratings formed by interference exposure in advance with an excitation beam source.

Excitation beam source for the organic DFB laser for use in the present invention includes, for example, a semiconductor laser, a semiconductor light emitting device, an organic light emitting device, etc.

Light source for use in interference exposure of the resonator in the present invention is not particularly limited, so long as it can cause photo-induced migration of the photo-induced mass transfer material, and, for example, an argon ion laser beam, etc. can be used. The resonator of the present organic DFB laser can form a periodic groove pattern (gratings) on the resonator surface, upon interference exposure, due to the characteristics of the azobenzene compound. The groove pattern is called "surface relief gratings", and can be erased by application of an appropriate quantity of heat or light thereto, and can be also formed again by interference exposure. By changing the interference exposure conditions, the period of grooves (gratings) to be formed can be controlled. That is, after the surface relief gratings once formed are erased by application of heat or light thereto, new surface relief gratings of difference shape can be formed by interference exposure in different conditions, thereby changing the laser emission wavelength. Thus, the present organic DFB laser has such a significant characteristic that the emission wavelength is programmable.

Furthermore, a plurality of laser beams having different wavelengths can be emitted at the same time by erasing the surface relief gratings in one region and forming again surface relief grating of different shape in the erased region by interference exposure under different conditions.

Still furthermore, irrespective of the resonator being in a double layer structure or in a single layer structure, one region of a photo-induced mass transfer material-containing layer can be subject to interference exposure, and at least one different region other than the former region can be subject to interference exposure under different conditions. By changing the interference exposure conditions region by region, surface relief gratings of different shapes can be formed and thus a plurality of laser beams of different wavelengths depending upon the different grating shapes can be emitted from the single substrate at the same time.

Still furthermore, one region of a photo-induced mass transfer material-containing layer can be subject to interference exposure, and the same region can be subject to interference exposure on under different conditions, thereby forming surface relief gratings of different shapes in the same region. Thus, a plurality of laser beams of different wavelengths can be emitted from the single substrate at the same time.

That is, the present organic DFB laser has such a significant characteristic that laser beams of different wavelengths can be emitted at the same time.

The present invention will be described in detail below, referring to Examples, which should not be construed as limitative to the present invention.

EXAMPLE 1 pDR1M, azobenzene polymer having the following repeat unit was used as a photo-induced mass transfer materials:

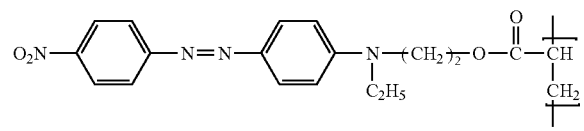

Sulforhodamine 640 (made by Exiton Co.) having the following chemical formula was used as an organic fluorescent molecule:

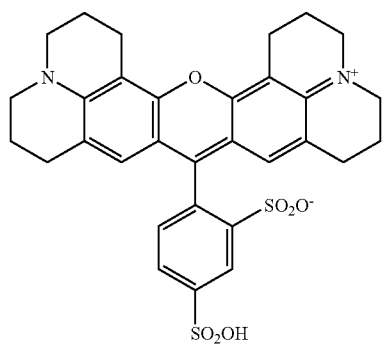

To fabricate a resonator in a double layer structure, an optical waveguide was prepared from these materials, followed by interference exposure.

(Preparation of Optical Waveguide)

An aqueous solution mixture containing 0.5 wt % Sulforhodamine 640 and 10 wt % polyvinyl alcohol was spincoated onto a quartz substrate having a flat surface, thereby forming an organic fluorescence layer having a film thickness of 615 nm (first layer). Then, a 3 wt % pDR1M solution in chloroform was likewise spincoated onto the surface of the organic fluorescence layer, thereby forming an azobenzene polymer layer having a film thickness of 118 nm (second layer).

Figure 4:
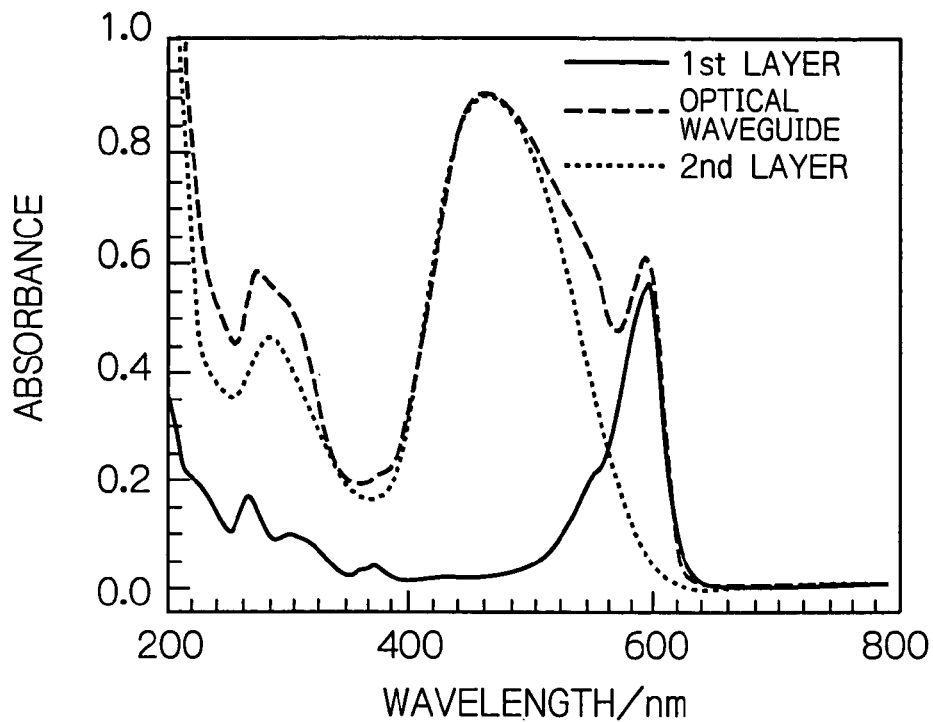
FIG. 4 is a diagram showing ultraviolet visible light absorption spectra of an optical waveguide layer serving as an organic DFB laser according to the present invention, where the full line shows ultraviolet visible light absorption spectra of organic fluorescent layer (first layer), the dotted line shows those of azobenzene layer (second layer), and the dashed line shows those of the optical waveguide layer as a sum total of those of the first and second layers.
Figure 5:
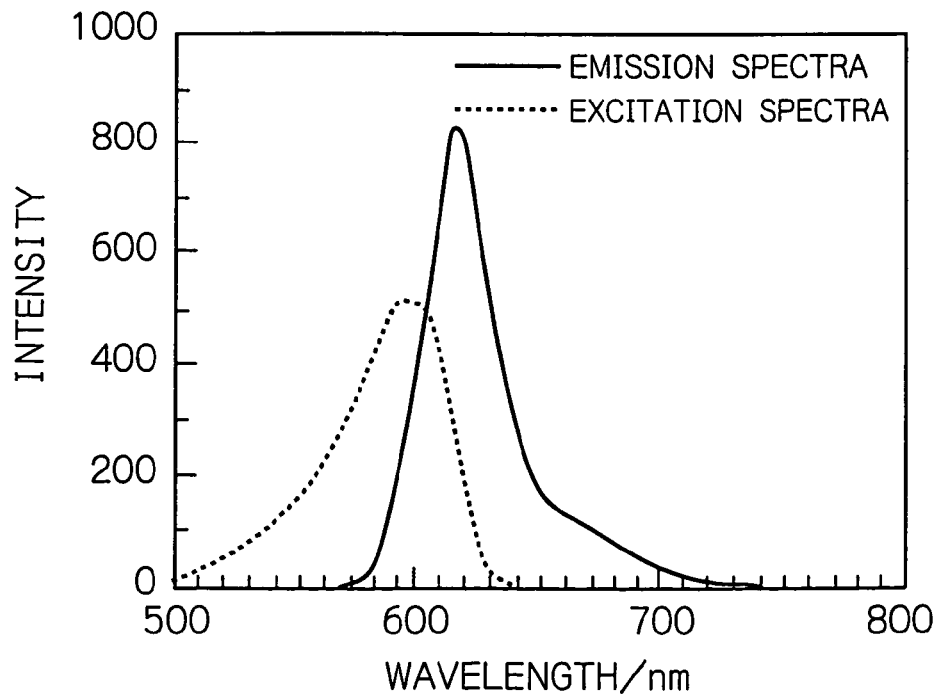
FIG. 5 shows fluorescence emission spectra of optical waveguide layer serving as an organic DFB laser according to the present invention, where the full line shows emission spectra excited with 541 nm and the dotted line shows excitation spectra detected with 665 nm.

The resulting optical waveguide had refractive indices as shown in Table 1 and ultraviolet visible light absorption spectra as shown in FIG. 4 and fluorescent emission spectra as shown in FIG. 5. In FIG. 4, the full line shows ultraviolet visible light absorption spectra of the first layer, the dotted line shows those of the second layer, and the dashed line shows those of the optical waveguide as sum total of the first and second layers. In FIG. 5, the full line shows emission spectra excited with 541 nm, and the dotted line shows excitation spectra detected with 665 nm.

TABLE 1

| Refractive indices of light-emitting device resonator | | |
|---|---|---|
| | Thickness (nm) | Refractive index (at 670 nm) |
| Azobenzene polymer layer (second layer) | 118 | 1.792 |
| Organic fluorescent layer (first layer) | 615 | 1.534 |
| Substrate | — | 1.456 |

(Interference Exposure of Optical Waveguide)

The resulting optical waveguide (sample) was subjected to interference exposure for 165 minutes by allowing two beam fluxes of p-polarized, collimated argon ion laser (488 nm, 36 mW/cm$^2$) at an angle $\theta=21.5°$ of the direction of the beam incident on the sample surface to the normal to the sample surface to reach the sample surface. The resulting gratings had a depth of 100 nm and a grating period of 666 nm. First-order diffraction efficiency with a helium neon laser was 4.7%.

(Lasing Test)

Figure 6:
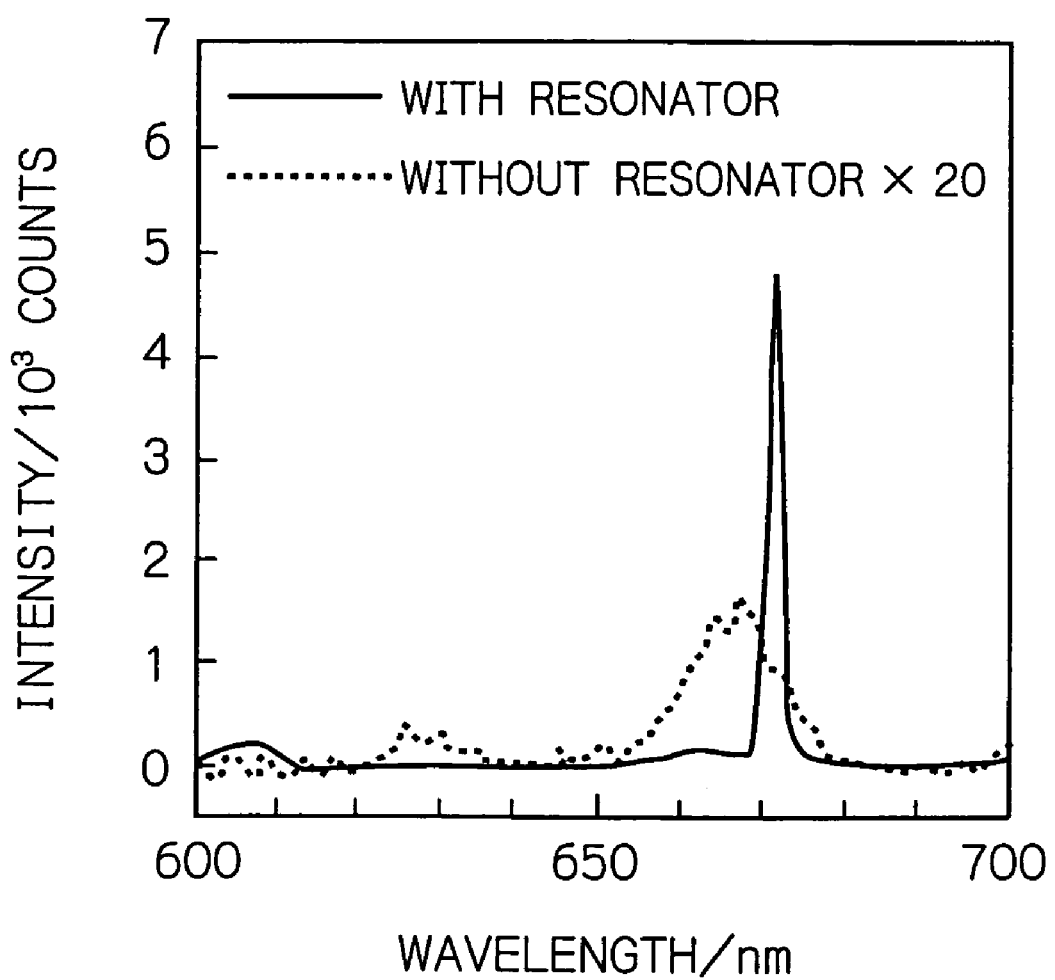
FIG. 6 is a diagram showing excitation laser beam of an organic DFB laser according to the present invention, where the dotted line shows amplified spontaneous emission from the optical waveguide layer without any resonator structure and the full line shows laser emission from an optical waveguide layer with a resonator structure, i.e. an organic DFB laser.

Excitation beam (605 nm, 300 μW) from an optical parametric amplifier was led to the resonator through a cylindrical lens, and the resulting emission laser beam was observed by a multi-channel photospectroanalyser through a spherical lens. Observation results are shown in FIG. 6 and Table 2 together with the results of optical waveguide layer without resonator structure (without interference exposure) as a control. In FIG. 6, the dotted line shows amplified spontaneous emission from the optical waveguide layer without the resonator structure, whereas the full line shows lasing from the optical waveguide layer with a resonator structure, i.e. an organic DFB laser. Table 2 shows maximum wavelength and full width at half maximum of detected light from the organic DFB laser (with the resonator structure) and the optical waveguide layer (without the resonator).

TABLE 2

| | Maximum wavelength and full width at half maximum of detected light | |
|---|---|---|
| | Maximum wavelength (nm) | Full width at half maximum (nm) |
| With resonator structure | 671.6 | 1.8 |
| Without resonator structure | 667.2 | 10.5 |

What is claimed is:

1. An organic distributed feedback laser, which comprises a resonator comprising a photo-induced mass transfer material layer and an organic fluorescent molecule layer provided as an under layer below the former layer,
wherein surface relief gratings are formed by subjecting the photo-induced mass transfer material-containing layer to interference irradiation,
wherein laser emission wavelength is programmable by erasing surface relief gratings once formed by application of heat or light thereto, and forming surface relief gratings of different shape by interference irradiation under different conditions, and
wherein a plurality of laser beams of different wavelengths are emitted by erasing the surface relief gratings in one region, and conducting interference irradiation of the erased region under different interference irradiation conditions, thereby forming surface relief gratings of different shape.

2. An organic distributed feedback laser according to claim 1, wherein the photo-induced mass transfer material is a polymer material having an azobenzene skeleton, represented by the following chemical formula:

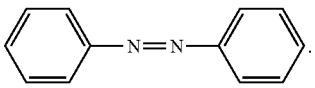

3. An organic distributed feedback laser, which comprises a resonator comprising a photo-induced mass transfer material layer and an organic fluorescent molecule layer provided as an under layer below the former layer,
wherein surface relief gratings are formed by subjecting the photo-induced mass transfer material-containing layer to interference irradiation, and
wherein a plurality of laser beams of different wavelengths are emittable at the same time by subjecting one region of the photo-induced mass transfer material-containing layer to interference irradiation, and subjecting at least one different region other than the former region to interference irradiation under different interference irradiation conditions, thereby forming a plurality of surface relief gratings of different shapes.

4. An organic distributed feedback laser according to claim 3, wherein the photo-induced mass transfer material is a polymer material having an azobenzene skeleton, represented by the following chemical formula:

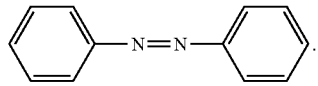

5. An organic distributed feedback laser, which comprises a resonator comprising a photo-induced mass transfer material layer and an organic fluorescent molecule layer provided as an under layer below the former layer,
wherein surface relief gratings are formed by subjecting the photo-induced mass transfer material-containing layer to interference irradiation, and
wherein a plurality of laser beams of different wavelengths are emittable by subjecting one region of the photo-induced mass transfer material-containing layer to interference irradiation, and further subjecting the same region to interference irradiation under different interference irradiation conditions, thereby forming surface relief gratings of different shapes.

6. An organic distributed feedback laser according to claim 5, wherein the photo-induced mass transfer material is a polymer material having an azobenzene skeleton, represented by the following chemical formula:

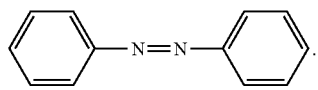

7. An organic distributed feedback laser, which comprises a resonator in a single layer structure comprising a photo-induced mass transfer material and organic fluorescent molecules,
wherein surface relief gratings are formed by subjecting the photo-induced mass transfer material-containing layer to interference irradiation,
wherein laser emission wavelength is programmable by erasing surface relief gratings once formed by application of heat or light thereto, and forming surface relief gratings of different shape by interference irradiation under different conditions, and
wherein a plurality of laser beams of different wavelengths are emitted by erasing the surface relief gratings in one region, and conducting interference irradiation of the erased region under different interference irradiation conditions, thereby forming surface relief gratings of different shape.

8. An organic distributed feedback laser according to claim 7, wherein the photo-induced mass transfer material is a polymer material having an azobenzene skeleton, represented by the following chemical formula:

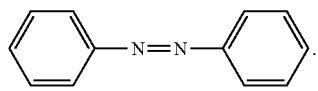

9. An organic distributed feedback laser, which comprises a resonator comprising a photo-induced mass transfer material layer and an organic fluorescent molecule layer provided as an under layer below the former layer, wherein surface relief gratings are formed by subjecting the photo-induced mass transfer material-containing layer to interference irradiation, and wherein a plurality of laser beams of different wavelengths are emittable at the same time by subjecting one region of the photo-induced mass transfer material-containing layer to interference irradiation, and subjecting at least one different region other than the former region to interference irradiation under different interference irradiation conditions, thereby forming a plurality of surface relief gratings of different shapes.

10. An organic distributed feedback laser according to claim 9, wherein the photo-induced mass transfer material is a polymer material having an azobenzene skeleton, represented by the following chemical formula:

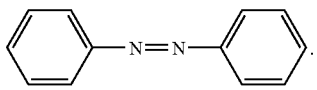

11. An organic distributed feedback laser, which comprises a resonator comprising a photo-induced mass transfer material layer and an organic fluorescent molecule layer provided as an under layer below the former layer, wherein surface relief gratings are formed by subjecting the photo-induced mass transfer material-containing layer to interference irradiation, and wherein a plurality of laser beams of different wavelengths are emittable by subjecting one region of the photo-induced mass transfer material-containing layer to interference irradiation, and further subjecting the same region to interference irradiation under different interference irradiation conditions, thereby forming surface relief gratings of different shapes.

12. An organic distributed feedback laser according to claim 11, wherein the photo-induced mass transfer material is a polymer material having an azobenzene skeleton, represented by the following chemical formula:

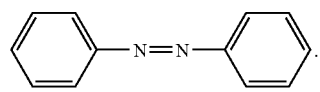

* * * * *